July 22, 1952 R. O. TESTON 2,604,235
SHAKER FOR SALT AND SIMILAR HYGROSCOPIC SUBSTANCES
Filed Aug. 7, 1950
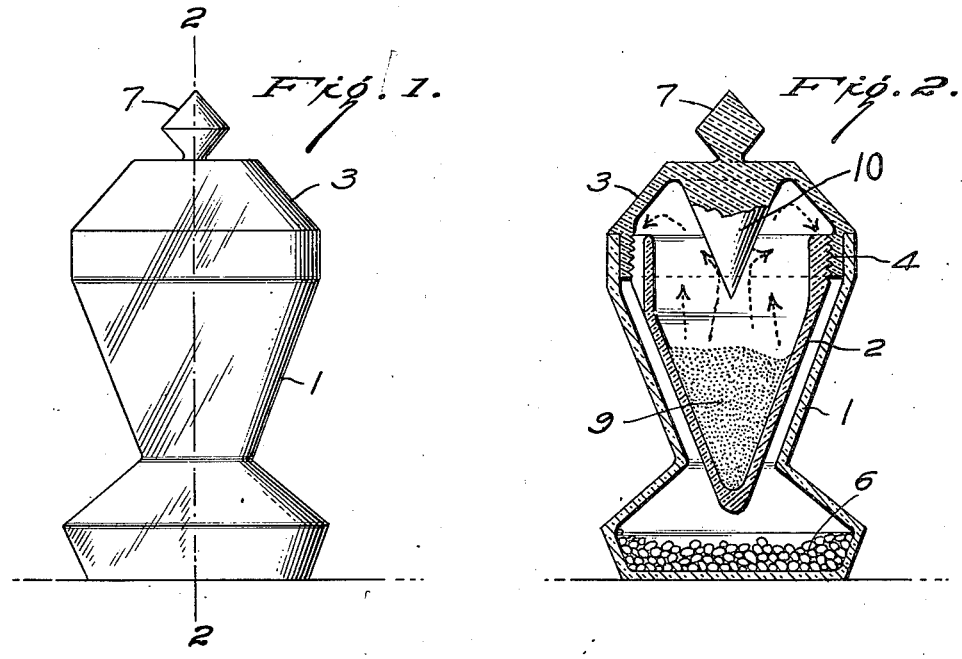
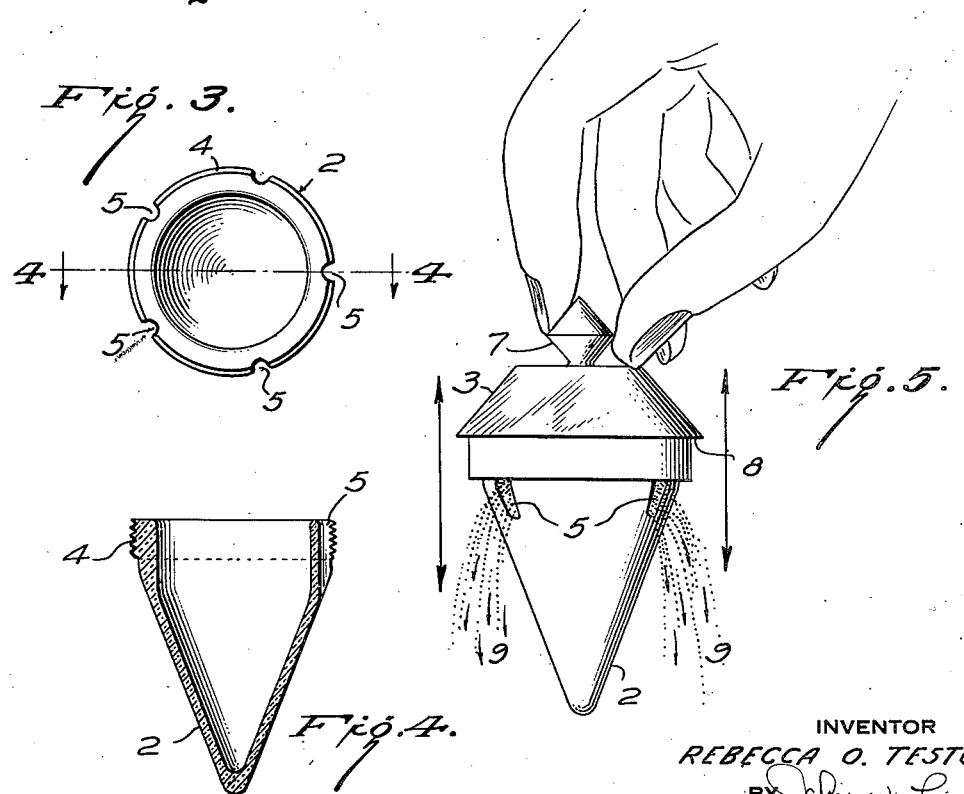
INVENTOR
REBECCA O. TESTON,
BY John W. Lee
ATTORNEY

Patented July 22, 1952

2,604,235

UNITED STATES PATENT OFFICE 2,604,235

SHAKER FOR SALT AND SIMILAR HYGROSCOPIC SUBSTANCES

Rebecca O. Teston, Glenbrook, Conn.

Application August 7, 1950, Serial No. 178,086

5 Claims. (Cl. 222—179.5)

This invention relates to a shaker for salt and similar hygroscopic substances.

More particularly, it relates to a dispenser for salt and similar hygroscopic substances comprising a shaker type dispenser and a receptacle type support for the dispenser wherein the limited quantity of air coming in contact with the material in the shaker is subjected to the drying action of a desiccant.

It is an advantage of this invention that a salt shaker and receptacle type holder are provided wherein, except in actual use, the shaker is enclosed in the receptacle, and the salt in the shaker is protected from the moist atmosphere by both physical and chemical means.

An outstanding advantage of the present invention is that a salt shaker is provided wherein the salt is exposed to the atmosphere only during the time salt is being shaken therefrom.

It is another advantage of this invention that a receptacle type holder for a salt shaker is provided wherein the receptacle contains a desiccant, and whereby the salt in the shaker is protected from the outside atmosphere when the shaker is at normal rest in the receptacle.

The advantages and other features of my invention are illustrated in the accompanying drawings in which:

Figure 1 is a side elevation illustrating my shaker-receptacle combination.

Figure 2 is a vertical section taken along the line of 2—2 of Figure 1.

Figure 3 is a top plan view of the salt chamber element of my combination.

Figure 4 is a vertical section along the line 4—4 of my element of Figure 3.

Figure 5 is a side elevation view of my shaker element when in actual use.

Referring specifically to the drawings, it is seen that the receptacle type holder 1 is designed to enclose the salt shaker element 2 when the shaker is suspended therein by means of the flange 8 on the cap 3. The cap 3 has internal threads which are threaded onto the external threads 4. The grooves 5 cut vertically through the external threads 4 to become discharge openings in the wall of the salt chamber 2 below the threaded area when the cap 3 is screwed into place. The receptacle type holder 1 has a base portion adapted for containing a desiccant 6. When used to dispense salt or similar hygroscopic materials, the shaker is grasped by the handle 7 and removed from the receptacle 1. With an up and down shaking motion of the shaker 2, the salt or other hygroscopic material is caused to be discharged through the capillaries formed by the grooves 5. The cap 3 preferably has a downwardly protruding cone 10 which serves to direct the salt over the exit tubes or grooves 5 when the shaker is shaken.

The shaker element is so designed that it will not rest in a vertical position on a table or other flat surface, and the user immediately following use will quite naturally replace it on the receptacle wherein the flange 8 on the top 3 rests on the lips of the opening at the open end of the receptacle 1. When thus returned to its normal position in the holder, the outside atmospheric air is excluded, and the small amount of air trapped in the space between the outer wall of the shaker 2 and the internal wall of the receptacle 1 comes into direct contact with the desiccant whereby the moisture is prevented from being absorbed by the salt.

In preparing the shaker for use, it is only necessary to remove the cap 3 from the shaker chamber 2 and fill the shaker through the top opening with salt 9 or other similar hygroscopic material which it is desired to dispense. The cap 3 is then replaced, and the shaker becomes a closed chamber with only the discharge grooves 5 being open. The shaker is placed in the receptacle holder where it remains in a vertical position with the salt 9 protected from the atmosphere until it is desired to dispense some salt therefrom.

In the drawings the shaker 2 is conical in shape, and this is my preferred form. In other modifications, it can be of a different shape so long as it is designed to prevent resting in a vertical position anywhere other than in the receptacle type holder when not in use. The shaker-receiving portion of the receptacle-holder is preferably shaped similar to the shaker and of such size that the shaker can easily be placed therein. The shaker drops on the receptacle-holder and fits smoothly but not so snugly as to require holding the receptacle in order to remove the shaker for use. The lips on the opening at the top 1 of the receptacle-holder should be smooth enough and wide enough so that the flange on the cap of the shaker will make a tight enough fit to exclude the atmosphere.

It is readily seen, therefore, that my invention encompasses a shaker for salt and similar hygroscopic substances comprising a support member in the form of a receptacle with a hollow base adapted for containing a desiccant and in communication therewith an upper chamber having an opening with a resting lip at the top, said upper chamber adapted to receive a hollow shaker body having at its upper end an externally threaded annular opening with a plurality of vertical grooves through said threads, a cap threaded onto said annular open end to form a closed hollow shaker body with the vertical grooves open to serve as discharge passages for material through the outside wall of the shaker body below the threaded area, a flange on the shaker body below the threaded area, a flange on the shaker body cap adapted for resting on the lip of the opening in the support member to form a moisture-tight seal and suspend the shaker body vertically within the upper chamber of said support receptacle and leaving an air passageway from the discharge openings to the desiccant chamber.

The shaker and receptacle-holder may be made of glass, metal, plastic, or any suitable rigid material normally employed for the construction of condiment dispensers. The shaker may be made of one material, and the receptacle-holder of another if desired. In my preferred form the receptacle-holder is fabricated from a heat resistant material so that the desiccant can be regenerated by heat.

Among the desiccants that can be employed in my receptacle are magnesium sulfate, sodium sulfate, calcium sulfate, dried silica gel and the like. Calcium sulfate and dried silica gel are outstanding inasmuch as they may be very readily regenerated by heat threatment and are at the same time physiologically inert. I have discovered that sodium carboxymethyl cellulose is of especial value as a desiccant in my improved shaker-desiccator, and it is considered my desiccant of choice.

I claim:

1. A shaker for salt and similar hygroscopic substances comprising a support member in the form of a receptacle with a hollow base adapted for containing a desiccant and in communication therewith an upper chamber having an opening with a resting lip at the top, said upper chamber adapted to receive a hollow shaker body having at its upper end an externally threaded annular opening with a plurality of vertical grooves through said threads, a cap threaded onto said annular open end to form a closed hollow shaker body with the vertical grooves open to serve as discharge passages for material through the outside wall of the shaker body below the threaded area, a flange on the shaker body cap adapted for resting on the lip of the opening in the support member to form a moisture-tight seal and suspend the shaker body vertically within the upper chamber of said support receptacle.

2. A shaker for salt and similar hygroscopic substances comprising a support member in the form of a receptacle with a hollow base adapted for containing a desiccant and in communication therewith an upper chamber having an annular opening with a resting lip at the top, said upper chamber adapted to receive a hollow shaker body having at its upper end an externally threaded annular opening with a plurality of vertical grooves through said threads, a cap threaded onto said annular open end to form a closed hollow shaker body with the vertical grooves open to serve as discharge passages for material through the outside wall of the shaker body below the threaded area, a flange on the shaker body cap adapted for resting on the lip of the opening in the support member to form a moisture-tight seal and suspend the shaker body vertically within the upper chamber of said support receptacle and leaving an air passageway from the discharge openings to the desiccant chamber.

3. A shaker for salt and similar hygroscopic substances comprising a support member consisting of a receptacle with a base containing a desiccant and an open-ended hollow upper body portion, a hollow shaker body with a pointed closed end and an externally threaded annular open end with a plurality of vertical grooves through said threads, a cap threaded onto said annular open end and projecting above the top of said shaker body to form a handle, said cap being slightly concave inside to permit the vertical grooves to serve as discharge passages for material below said threaded area, an annular flange on the cap adapted for resting on the upper end of the support member to form a moisture-tight seal and suspend the shaker body inside the upper body portions of the receptacle whereby an opening is formed between the outer wall of said shaker and the inner wall of said receptacle which opening communicates with the desiccant contained in the base.

4. A shaker for salt and similar hygroscopic substances comprising a support member consisting of a receptacle with a base containing a desiccant and an open-ended hollow upper body portion, a hollow shaker body of substantially conical external form with the pointed-end closed and an externally threaded annular opening at the large end with a plurality of vertical grooves through said threads, a cap threaded onto said annular open end and projecting above the top of said shaker body to form a handle, said cap being slightly concave inside to permit the vertical grooves to serve as discharge passages for material below said threaded area, an annular flange on the cap adapted for resting on the upper end of the support member to form a moisture-tight seal and suspend the shaker body inside the upper body portion of the receptacle whereby an opening is formed between the outer wall of said shaker and the inner wall of said receptable which opening communicates with the desiccant contained in the base.

5. A shaker type holder for salt and similar hygroscopic substances comprising a hollow shaker body being conical in shape and having external threads at the end opposite the apex adapted for receiving an internally threaded cap, a plurality of vertical grooves passing through the threads on the said shaker to provide discharge openings in the exterior wall of the shaker body, a support member including a base with a desiccant chamber and a hollow upper portion adapted for enclosing the hollow shaker body when supported therein by contact with an annular flange on the cap of the shaker body and forming an opening between the outer wall of said shaker body and the inner wall of the support member which opening communicates with the desiccant chamber in the said base.

REBECCA O. TESTON.

REFERENCES CITED

The following references are of record in the file of this patent:

UNITED STATES PATENTS

| Number | Name | Date |
|---|---|---|
| 913,026 | Meaker | Feb. 23, 1909 |
| 1,567,726 | Frierson | Dec. 29, 1925 |
| 1,947,600 | Isenhower | Feb. 20, 1934 |